United States Patent
Noguchi et al.

(10) Patent No.: US 7,562,512 B2
(45) Date of Patent: Jul. 21, 2009

(54) BAG MANUFACTURING AND PACKAGING SYSTEM

(75) Inventors: Takeshi Noguchi, Ritto (JP); Yuji Yokota, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 0 days.

(21) Appl. No.: 11/871,382

(22) Filed: Oct. 12, 2007

(65) Prior Publication Data

US 2008/0086986 A1    Apr. 17, 2008

(30) Foreign Application Priority Data

Oct. 12, 2006    (JP) ............................. 2006-278205

(51) Int. Cl.
*B65B 19/04*    (2006.01)

(52) U.S. Cl. .............................. 53/551; 53/550; 53/167; 53/570

(58) Field of Classification Search ................... 53/551, 53/550, 552, 53, 502, 64, 51, 570, 167
See application file for complete search history.

(56) References Cited

U.S. PATENT DOCUMENTS

| | | | | |
|---|---|---|---|---|
| 4,514,959 A * | 5/1985 | Shroyer | ........................ | 53/428 |
| 5,622,025 A * | 4/1997 | Kitagawa et al. | ................ | 53/53 |
| 6,164,436 A * | 12/2000 | Taylor | ...................... | 198/689.1 |
| 6,285,918 B1 * | 9/2001 | Kono | ......................... | 700/240 |
| 6,711,874 B1 * | 3/2004 | Nakagawa et al. | ............. | 53/64 |
| 7,328,544 B2 * | 2/2008 | Yokota et al. | ................. | 53/167 |
| 2002/0014055 A1 * | 2/2002 | Iwasa et al. | .................... | 53/551 |
| 2006/0156691 A1 | 7/2006 | Yokota et al. | | |

FOREIGN PATENT DOCUMENTS

JP    2002-37206 A    2/2002

* cited by examiner

*Primary Examiner*—Sameh H. Tawfik
(74) *Attorney, Agent, or Firm*—Global IP Counselors, LLP

(57) ABSTRACT

A bag manufacturing and packaging system includes a vertical bag manufacturing and packaging machine, a conveyor part, a pair of rotating brushes and a guide member. The vertical bag manufacturing and packaging machine is arranged to manufacture a bag, and to cut out and eject the bag. The conveyor part is disposed in a downstream portion to receive the bag at a predetermined position to convey the bag. The rotating brushes are positioned between the vertical bag manufacturing and packaging machine and the conveyor part to sandwich the bag ejected from the vertical bag manufacturing and packaging machine to send the bag to the predetermined position. The guide member is disposed between the rotating brushes to guide the bag conveyed between the rotating brushes toward a center portion of the rotational brushes with respect to a direction parallel to rotational axes of the rotating brushes.

18 Claims, 16 Drawing Sheets

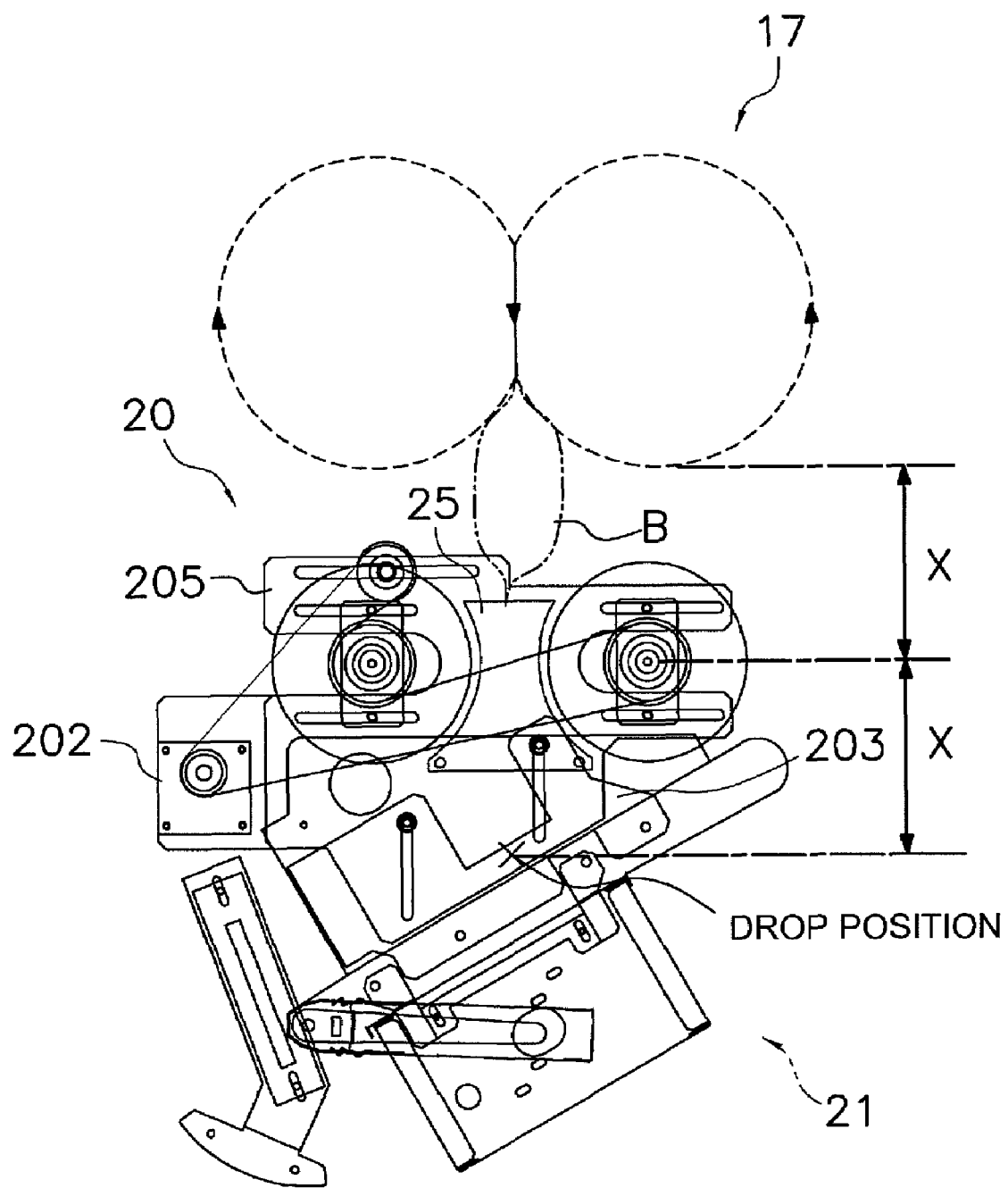
F I G. 7

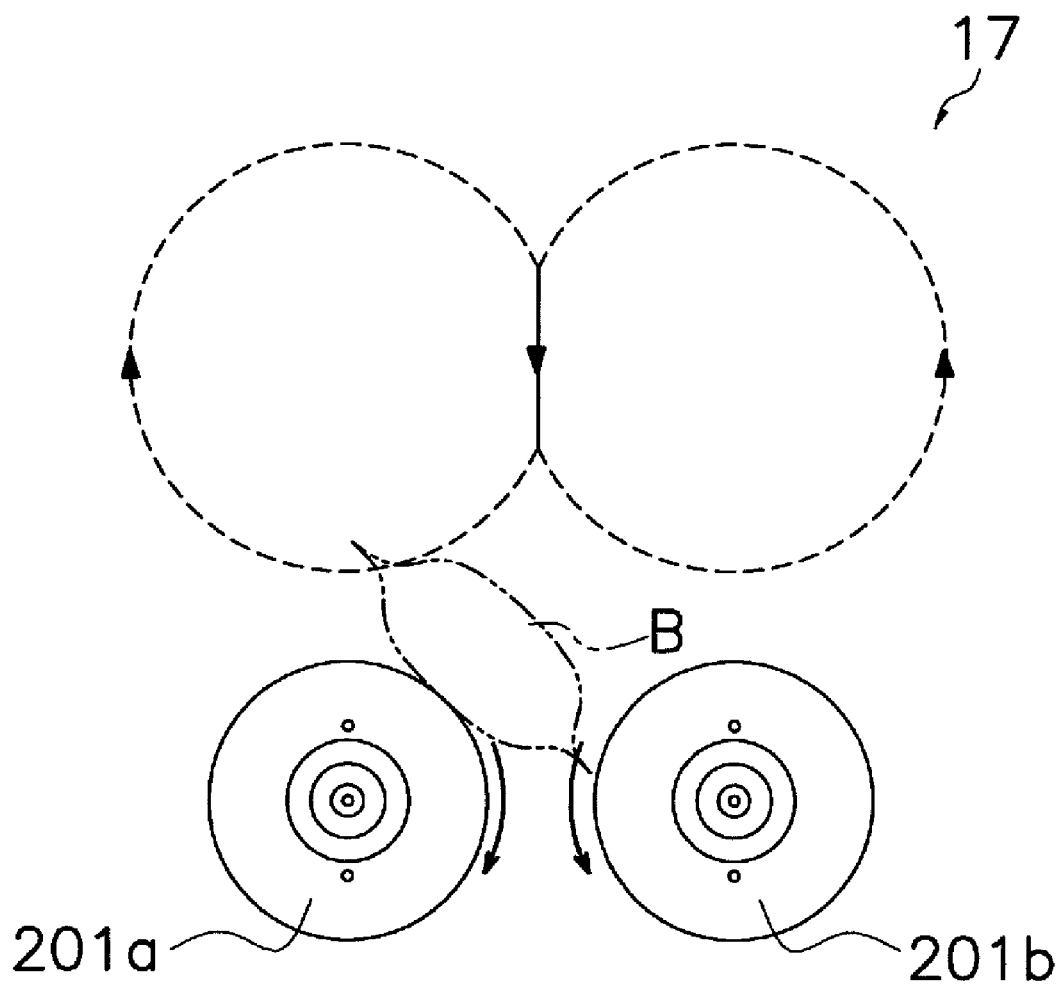
F I G. 13

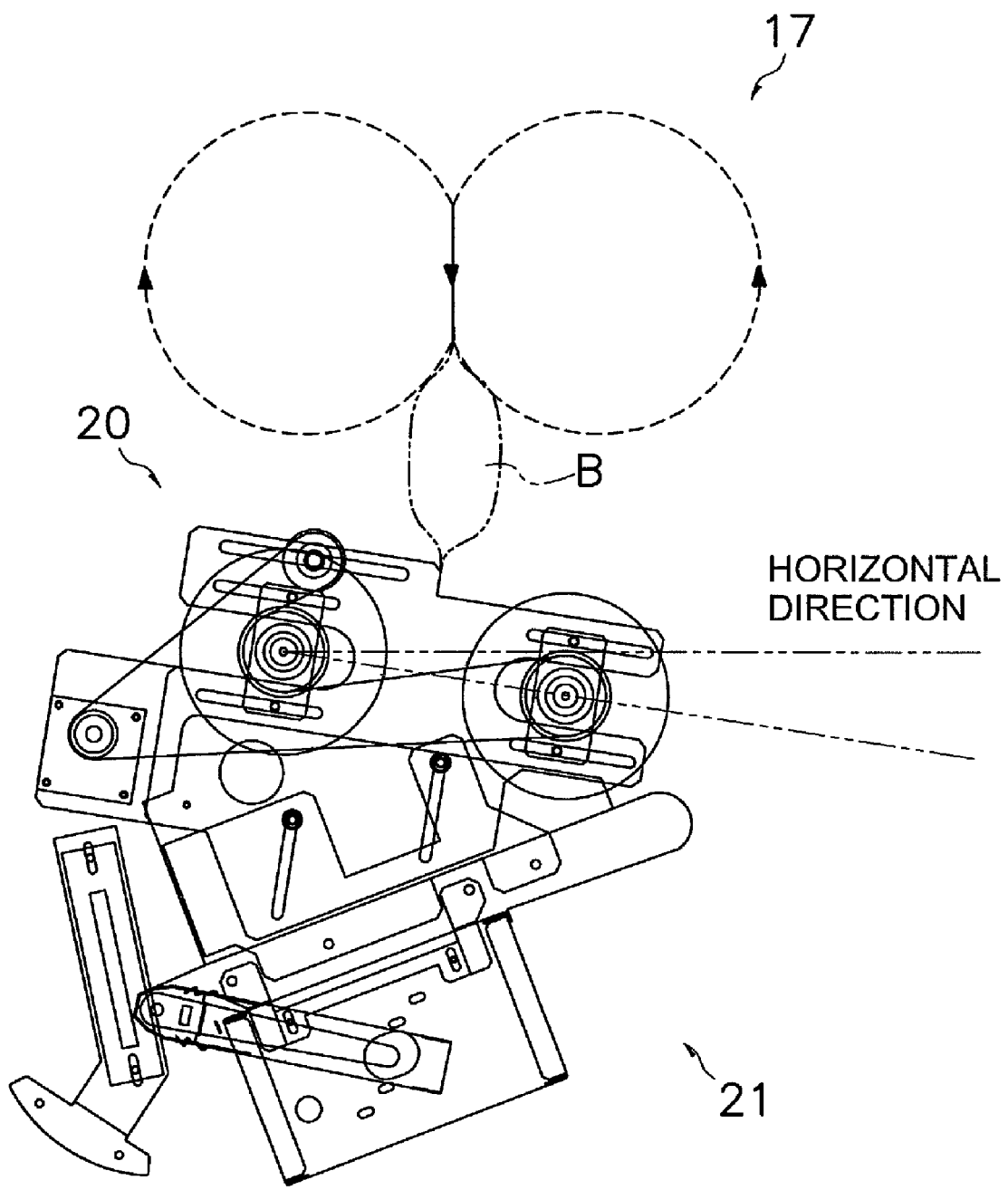
F I G. 15

US 7,562,512 B2

BAG MANUFACTURING AND PACKAGING SYSTEM

CROSS-REFERENCE TO RELATED APPLICATIONS

This application claims priority to Japanese Patent Application No. 2006-278205, filed on Oct. 12, 2006. The entire disclosure of Japanese Patent Application No. 2006-278205 is hereby incorporated herein by reference.

BACKGROUND OF THE INVENTION

1. Field of the Invention

The present invention relates to a bag manufacturing and packaging system having a vertical bag manufacturing and packaging machine that manufacture a plurality of bags filled with articles to be packaged by sealing a continuous tubular packaging material filled with the articles, and that cuts out and ejects the bags toward a downstream portion.

2. Background Information

Bag manufacturing and packaging machines are a type of vertical bag manufacturing and packaging system for loading snack food or other articles that is to be packaged into a bag while the bag is being manufactured.

For example, Japanese Laid-Open Patent Application No. 2002-037206 (published Feb. 6, 2002) discloses a conventional bag manufacturing and packaging machine in which the packaging material is a sheet-form film that is formed into a tubular shape by a former and a tube. The overlapping vertical edges of the tubular packaging material are heat sealed (heat welded) by a vertical sealing mechanism, resulting in tubular packaging material. The articles are filled from the tube to the inside of the tubular packaging material, which will ultimately be made into bags. The upper end parts of the bag and the subsequent lower end parts of the following bag are heat-sealed in an overlapping manner by the sealing jaws of a horizontal sealing mechanism below the tube. The center of the heat-sealed portion (the horizontally sealed portion) is then cut by a cutter.

The cut bags are received onto a chute conveyor that is positioned directly below the horizontal sealing mechanism. The bags are then conveyed to a seal checker or other post-processing device positioned downstream.

In view of the above, it will be apparent to those skilled in the art from this disclosure that there exists a need for an improved bag manufacturing and packaging system. This invention addresses this need in the art as well as other needs, which will become apparent to those skilled in the art from this disclosure.

SUMMARY OF THE INVENTION

However, the conventional vertical bag manufacturing and packaging machine as described in the above mentioned reference have the following problems. Specifically, the bags that are sealed by the horizontal sealing mechanism are cut individually by the cutter, but the cut bags may adhere to one of the pair of sealing jaws of the horizontal sealing mechanism. In such instances, the bag that was expected to drop to the conveyor part soon after cutting may move along with the sealing jaw, and the ejection position of the bag may be displaced. The position at which a bag that has adhered to a sealing jaw drops onto the chute conveyor will be displaced when the bags are conveyed in the direction of conveyance of the chute conveyor after the sealing jaws have sealed the bags. Thus, the interval (pitch) between bags on the chute conveyor will not be able to be held constant. The occurrence of such bag pitch displacement is particularly notable when the speed of operation of the vertical bag manufacturing and packaging machine is increased. As a result, bags may accumulate in the post-processing bag manufacturing and packaging system, the post-processing devices may be unable to process some bags, and other problems may occur.

It is an object of the present invention to provide a bag manufacturing and packaging system configured to stabilize the drop position of bags on a conveyor part positioned downstream from a bag manufacturing and packaging machine and to smoothly convey the bags to the conveyor part.

A bag manufacturing and packaging system according a first aspect includes a vertical bag manufacturing and packaging machine, a conveyor part, a pair of rotating brushes and a guide member. The vertical bag manufacturing and packaging machine is configured and arranged to manufacture a bag by sealing a continuous tubular packaging material filled with articles to be packaged, and to cut out and eject the bag. The conveyor part is disposed in a downstream portion of the vertical bag manufacturing and packaging machine to receive the bag ejected from the vertical bag manufacturing and packaging machine at a predetermined position to convey the bag toward a downstream portion of the conveyor part. The rotating brushes are positioned between the vertical bag manufacturing and packaging machine and the conveyor part to sandwich the bag ejected from the vertical bag manufacturing and packaging machine to send the bag to the predetermined position on the conveyor part. The guide member is disposed between the rotating brushes to guide the bag conveyed between the rotating brushes toward a center portion of the rotational brushes with respect to a direction parallel to rotational axes of the rotating brushes.

According to the first aspect, the guide member is provided between the rotating brushes to guide the bag toward the vicinity of the center portion in the direction parallel to the rotational axes of the rotating brushes. The rotating brushes receive the conveyed bag, which was manufactured upstream, and transfer the bag to the conveyor part positioned downstream. The bag is thereby guided toward the vicinity of the center portion by the guide member, whereby the drop position of the bag onto the conveyor part, which is positioned directly downstream from the rotating brushes, can be stabilized. In other words, the bag is centered in the rotating brushes even in instances in which the position of the bag conveyed between the rotating brushes from upstream is displaced, or in which the bag is conveyed slantwise. The bag can thereby be stably dropped onto a predetermined position on the conveyor part positioned downstream.

The bag manufacturing and packaging system according to a second aspect is preferably arranged such that the guide member includes a plurality of guide parts that are spaced apart in the direction parallel to the rotational axes of the rotating brushes.

According to the second aspect, since the guide member includes the plurality of the guide parts, that guide parts are positioned between the rotating brushes and are aligned in the direction parallel to the rotational axes of the rotating brushes. The guide parts are thereby positioned, e.g., near both end parts in the direction parallel to the rotational axes of the rotating brushes, whereby the bag can be guided toward the vicinity of the center portion in the direction parallel to the rotational axes of the rotating brushes even when the bag is conveyed from upstream in irregular positions in the direction parallel to the rotational axes of the rotating brushes.

The bag manufacturing and packaging system according to a third aspect is preferably arranged so that each of the guide parts of the guide member includes a guiding portion dimensioned such that a distance between the guiding portions of the guide parts in the direction parallel to the rotational axes of the rotating brushes is larger at an upstream end portion of the guide member than at a downstream end portion of the guide member.

According to the third aspect, the guide parts of the guide member include the guiding portions in which the interval between the guiding parts increases in the upstream direction. The bag thereby drops into the gap between the guide parts regardless of the position in which the bag is conveyed in the direction parallel to the rotational axes of the rotating brushes from upstream. Therefore, the bag can be quickly guided toward the vicinity of the center portion of the rotating brushes.

The bag manufacturing and packaging system according to a fourth aspect is preferably arranged such the guide parts of the guide member are spaced apart in the direction parallel to the rotational axes of the rotating brushes by a distance that is larger than a width of the bag conveyed between the rotating brushes.

According to the fourth aspect, the positional intervals of the guide parts included in the guide member are set using the width of the bag conveyed between the rotating brushes as a reference. Therefore, the bag conveyed between the rotating brushes can be smoothly conveyed downstream while being centered by the guide member, without being caught within the guide member.

The bag manufacturing and packaging system according to a fifth aspect is preferably arranged such the guide parts of the guide member are disposed in positions located inwardly from axial end parts of the rotating brushes in the direction parallel to the rotational axes of the rotating brushes.

According to the fifth aspect, the guide parts that constitute the guide member are positioned further inward than both ends of the rotating brushes in the direction parallel to the rotational axes of the rotating brushes. Thus, the bag conveyed onto the rotating brushes can be smoothly conveyed to the downstream conveyor part while being centered by the guide parts.

The bag manufacturing and packaging system according to a sixth aspect is preferably arranged such that each of the guide parts of the guide member includes an arcuate portion disposed adjacent to the rotating brushes.

According to the sixth aspect, since the arcuate portions are provided to the guide parts of the guide member, these arcuate portions are dimensioned and positioned so as not to interfere with the rotating brushes when the guide parts are positioned near the rotating brushes, whereby the rotating brushes and the guide parts can be positioned in close proximity. As a result, the bag can be prevented from being ejected from the gap between the rotating brushes and the guide parts in the direction parallel to the rotational axes of the rotating brushes, and the bag can be stably conveyed to the downstream conveyor part.

The bag manufacturing and packaging system according to a seventh aspect is preferably arranged such that each of the rotating brushes includes a flexible brush portion.

According to the seventh aspect, the flexible material is used for the brush portions of the rotating brushes. Since the brush portions are thereby made flexible, switching the direction of conveyance of the bag is not impeded even when the direction of conveyance of the bag is switched by the guide member. As a result, the bags conveyed between the rotating brushes can be smoothly centered and conveyed downstream.

According to the bag manufacturing and packaging system of the above aspects, the bag is centered in the rotating brushes even in instances in which the position of the bags conveyed between the rotating brushes from upstream is displaced, or in which the bag is conveyed slantwise. A plurality of the bags can thereby be stably dropped onto a predetermined position on the conveyor part positioned downstream.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 7 is an enlarged front elevational view of the horizontal sealing mechanism, a rotating brush mechanism, and a chute conveyor of the bag manufacturing and packaging system shown in FIG. 2 illustrating the positional relationships of those parts according to the illustrated embodiment of the present invention;

FIG. 13 is a schematic diagram showing an example of when in ejection position of a bag in the horizontal sealing mechanism is displaced;

FIG. 15 is a front elevational view of the rotating brush mechanism according to a second modified embodiment of the present invention.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Referring to FIGS. 1 to 13, a bag manufacturing and packaging system 1 is illustrated in accordance with one embodiment of the present invention.

Overall Configuration of bag Manufacturing and Packaging System 1

Figure 1:
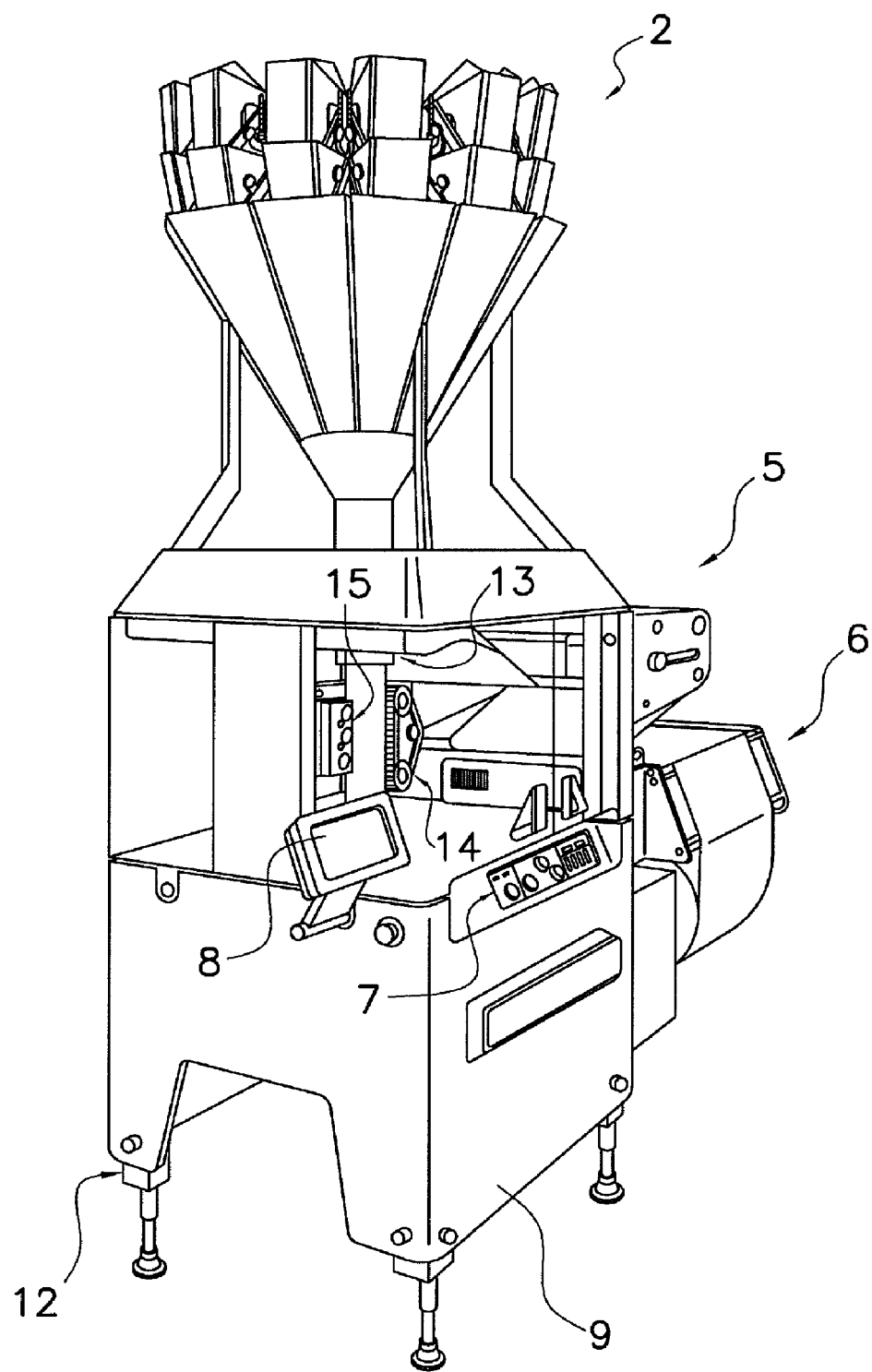
FIG. 1 is a perspective view of a bag manufacturing and packaging system on a side of a bag manufacturing and packaging machine according to one embodiment of the present invention.
Figure 2:
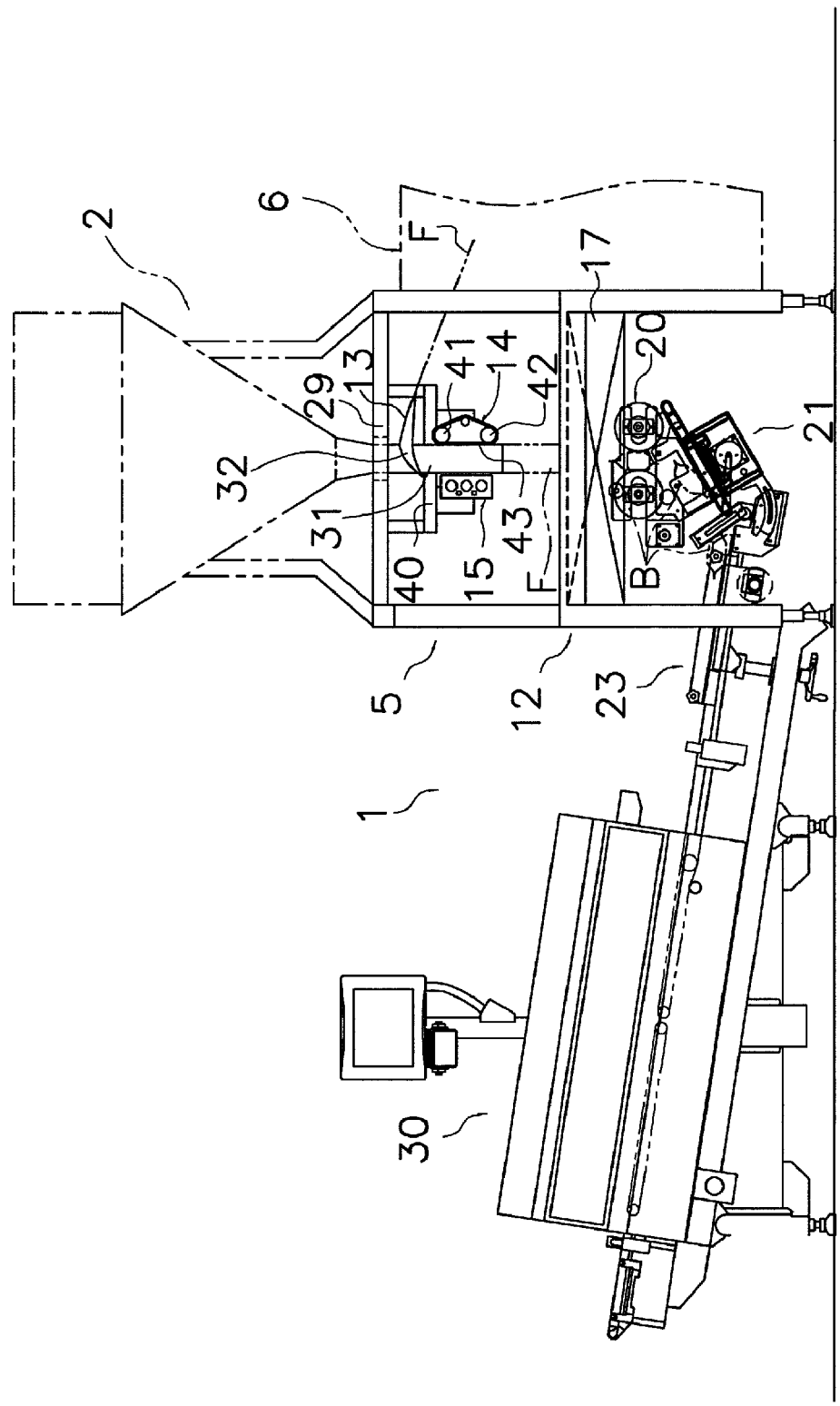
FIG. 2 is an overall front elevational view of the bag manufacturing and packaging system according to the illustrated embodiment of the present invention.

The bag manufacturing and packaging system 1 of the present embodiment includes a vertical bag manufacturing and packaging part 5 (vertical bag manufacturing and packaging machine) that bags potato chips or other contents into bags, as shown in FIG. 1, and various parts that are positioned downstream from the vertical bag manufacturing and packaging part 5 as shown in FIG. 2. More specifically, as shown in FIG. 2, the bag manufacturing and packaging system 1 basically includes the vertical bag manufacturing and packaging part 5, a film-feeding part 6, a rotating brush mechanism 20, a chute conveyor 21 (conveyor part), a conveyor 23, and a seal checker 30.

The vertical bag manufacturing and packaging part 5 forms a main-body portion, and configured and arranged to pack the contents or articles into bags. The film-feeding part 6 is configured and arranged to feed the film used to form the bags to the vertical bag manufacturing and packaging part 5. The seal checker 30 is configured and arranged to inspect bags B that are manufactured in the vertical bag manufacturing and packaging part 5. A plurality of operational switches 7 are positioned on the front surface of the vertical bag manufacturing and packaging part 5 as shown in FIG. 1. Also, a liquid crystal display 8 configured and arranged to display the operational state is positioned in a location visible to the operator who operates the operational switches 7.

Configuration of Film-Feeding Par 6 and Vertical Bag Manufacturing and Packaging Part 5

The film-feeding part 6 performs the role of feeding a sheet-form film to a shape-forming mechanism 13 of the vertical bag manufacturing and packaging part 5, which is described hereinafter. The film-feeding part 6 is provided adjoining the vertical bag manufacturing and packaging part 5 in this instance. Rolled-up film is positioned in the film-feeding part 6, and the film is drawn from the roll.

As shown in FIGS. 1 and 2, the vertical bag manufacturing and packaging part 5 includes the shape-forming mechanism 13, a pull-down belt mechanism 14, a vertical sealing mechanism 15, a horizontal sealing mechanism 17 and a supporting frame 12. The shape-forming mechanism 13 is configured and arranged to shape the film that is sent in sheet-form into a tube. The pull-down belt mechanism 14 is configured and arranged to downwardly convey the film that has taken on a tube shape (referred to below as "tubular film"). The vertical sealing mechanism 15 is configured and arranged to vertically heat-seal the overlapping portions of the tubular film. The horizontal sealing mechanism 17 is configured and arranged to horizontally seal the tubular film and thereby closing the upper and lower ends of the bags B. The supporting frame 12 supports these mechanisms of the vertical bag manufacturing and packaging part 5. Also, a casing 9 is attached to the periphery of the supporting frame 12.

The shape-forming mechanism 13 has a tube 31 and a former 32, as shown in FIG. 2. The tube 31 is a cylindrical member that has apertures at the top and bottom ends. The tube 31 is positioned in an aperture portion near the center of a top plate 29. The tube is integrated with the former 32 via a bracket that is not shown. The articles that are measured by a combination weighing machine 2 are put into the aperture part at the top end of the tube 31. The former 32 is positioned so as to enclose the tube 31. The former 32 is shaped so that a sheet-form film F fed from the film-feeding part 6 is formed into a tube shape when passing between the former 32 and the tube 31. The former 32 is also affixed to the supporting frame 12 via a supporting member that is not shown. The tube 31 and the former 32 of the shape-forming mechanism 13 can be replaced according to the width dimension of the bags B to be manufactured. The shape-forming mechanism 13 is therefore detachable from the supporting frame 12.

The pull-down belt mechanism 14 and the vertical sealing mechanism 15 are supported by a rail 40 suspended from the top plate 29 and are positioned so as to sandwich the tube 31 from both sides. The positions of these mechanisms 14, 15 are moved along the rail 40 and aligned when the tube 31 is attached. The pull-down belt mechanism 14 chucks the tubular film F that is rolled up on the tube 31 and conveys the film downward. The pull-down belt mechanism primarily includes a driving roller 41, a driven roller 42, and a belt 43 that has a chucking function. The vertical sealing mechanism 15 heats the overlapping portions of the tubular film wrapped around the tube 31 while pressing these portions onto the tube 31 at a constant pressure, making a vertical seal. The vertical sealing mechanism 15 has a heater, a heater belt that is heated by the heater and that contacts the overlapping portions of the tubular film, and other conventional components.

Configuration of Horizontal Sealing Mechanism 17

Figure 3:
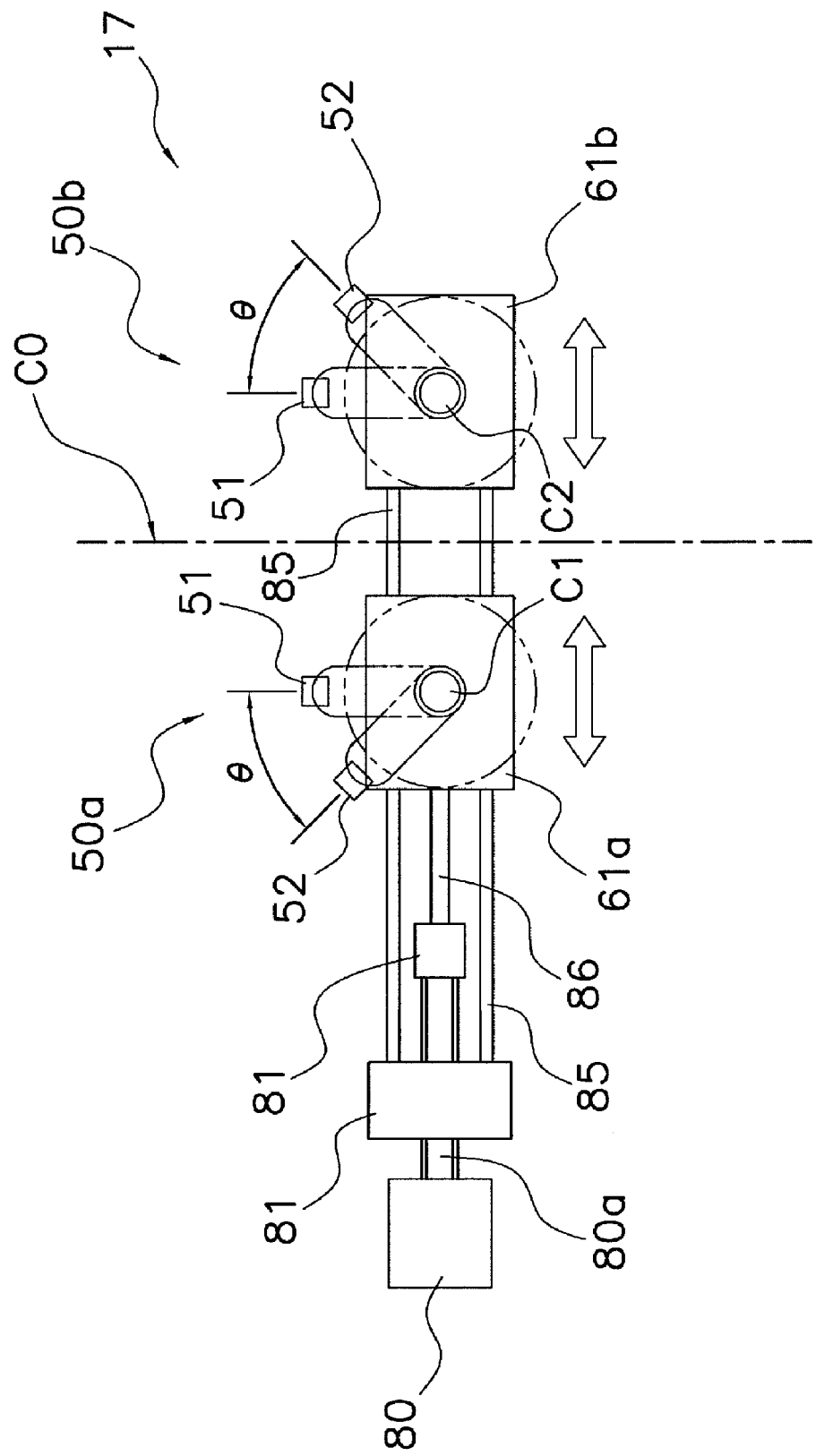
FIG. 3 is an enlarged front elevational view of a horizontal sealing mechanism of the bag manufacturing and packaging system shown in FIG. 1 according to the illustrated embodiment of the present invention.
Figure 4:
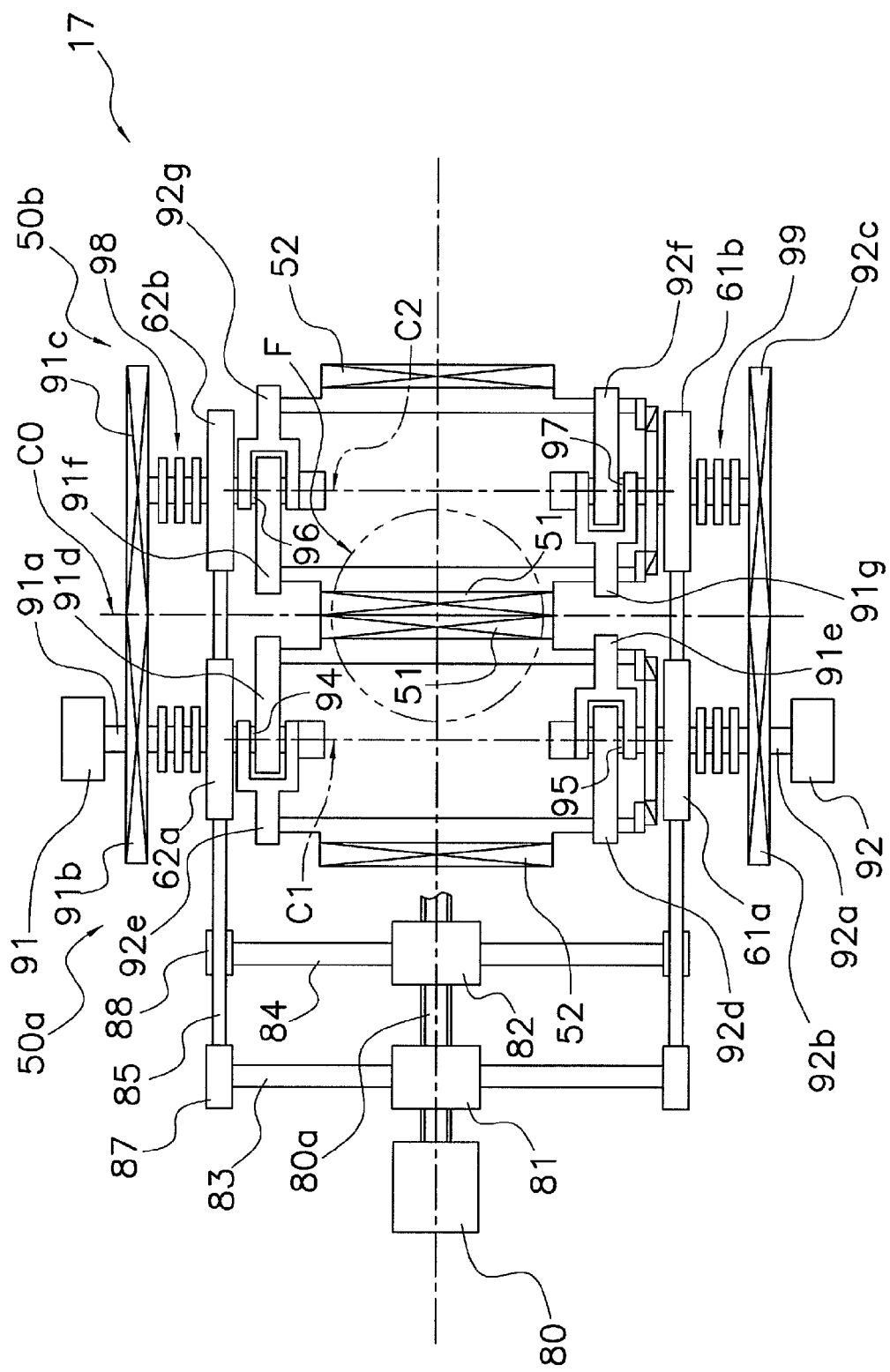
FIG. 4 is a top plan view of the horizontal sealing mechanism shown in FIG. 3 according to the illustrated embodiment of the present invention.
Figure 5:
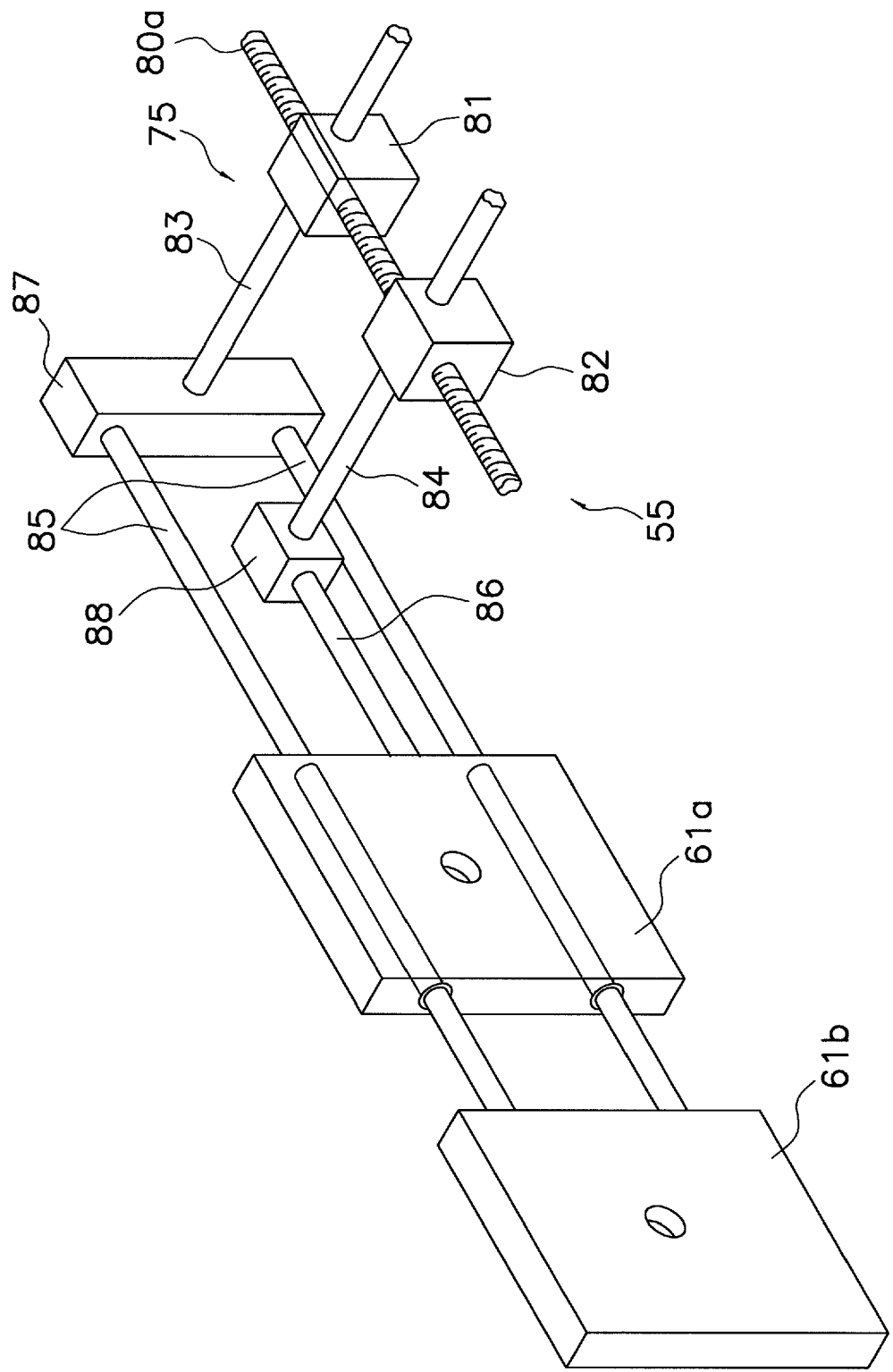
FIG. 5 is a perspective view of an exterior parts of a horizontal driving mechanism coupled to the horizontal sealing mechanism according to the illustrated embodiment of the present invention.

Referring now to FIGS. 3 to 5, the horizontal sealing mechanism 17 will be described in detail.

The horizontal sealing mechanism 17 is positioned below the shape-forming mechanism 13, the pull-down belt mechanism 14, and the vertical sealing mechanism 15 and is supported by the supporting frame 12. The horizontal sealing mechanism 17 includes left and right sealing-jaw moving units 50a and 50b, as shown in FIGS. 3 and 4. The sealing-jaw moving units 50a and 50b are used so that as the two sets of sealing jaws 51 and 52 are made to revolve in a D shape, the pair of the sealing jaws 51 or the sealing jaws 52 of the sealing-jaw moving units 50a and 50b will be pressed together when the tubular film is horizontally sealed. The unit that is positioned to the left of the tubular film F in FIGS. 3 and 4 will be referred to below as the first sealing-jaw moving unit 50a, and the unit positioned to the right will be referred to as the second sealing-jaw moving unit 50b. The tubular film F is conveyed downward along a surface C0, which partitions the sealing jaw moving units 50a and 50b, in a state in which the surface C0 is at the center of the tubular film F in the widthwise direction.

The sealing-jaw moving units 50a and 50b both have the sealing jaws 51 and 52, but the driving motors driving the sealing jaws 51 and the driving motor of the sealing jaws 52 are different. The sealing jaws 51 rotate around axes C1 and C2 due to rotation of a driving motor 91. In other words, the sealing jaw 51 of the first sealing-jaw moving unit 50a rotates around the axis C1, and the sealing jaw 51 of the second sealing-jaw moving unit 50b rotates around the axis C2. Meanwhile, the sealing jaws 52 rotate around the axes C1 and C2 due to rotation of a driving motor 92. In other words, the sealing jaw 52 of the first sealing-jaw moving unit 50a rotates around the axis C1, and the sealing jaw 52 of the second sealing-jaw moving unit 50b rotates around the axis C2.

A pair of gears 91b and 91c rotate due to the rotation of the driving motor 91, and the rotation is conveyed via a Schmidt coupling 98 to revolving shafts 94 and 96 that are coaxial with the revolving axes C1 and C2 of the sealing-jaw moving units 50a and 50b. One end of a lever 91d is fixed to the revolving shaft 94, and one end of a lever 91f is fixed to the revolving shaft 96. The levers 91d and 91f therefore rotate around the revolving axes C1 and C2.

A pair of gears 92b and 92c rotate due to the rotation of the driving motor 92, and the rotation is conveyed via a Schmidt coupling 99 to revolving shafts 95 and 97 that are coaxial with the revolving axes C1 and C2 of the sealing-jaw moving units 50a and 50b. One end of a lever 92d is fixed to the revolving shaft 95, and one end of a lever 92f is fixed to the revolving shaft 97. The levers 92d and 92f therefore rotate around the revolving axes C1 and C2.

The sealing jaw 51 of the first sealing-jaw moving unit 50a is supported by the tip of the lever 91d on one end and by the tip of a lever 91e on the other end. The lever 91e is a member that rotates around the revolving axis C1 and is supported by the revolving shaft 95 so as to be capable of relative rotation therewith.

The sealing jaw 51 of the second sealing-jaw moving unit 50b is supported by the tip of the lever 91f on one end and by the tip of a lever 91g on the other end. The lever 91g is a member that rotates around the revolving axis C2 and is supported by the revolving shaft 97 so as to be capable of relative rotation therewith.

The sealing jaw 52 of the first sealing-jaw moving unit 50a is supported by the tip of the lever 92d on one end and by the tip of a lever 92e on the other end. The lever 92e is a member that rotates around the revolving axis C1 and is supported by the revolving shaft 94 so as to be capable of relative rotation thereto.

The sealing jaw 52 of the second sealing-jaw moving unit 50b is supported by the tip of the lever 92f on one end and by the tip of a lever 92g on the other end. The lever 92g is a member that rotates around the revolving axis C2 and is supported by the revolving shaft 96 so as to be capable of relative rotation therewith.

The sealing jaws 51 and 52 are members that are formed extending farther in the vertical direction of FIG. 4 than the dimensions of the tubular film F. The sealing jaws have heaters on the inside. The sealing surfaces of the sealing jaws 51 and 52 are heated by these heaters, and the part of the tubular film F that is sandwiched by the left and right sealing jaws 51 and 52 is thermally sealed.

The Schmidt couplings 98 and 99 include three round plates that are connected by linkages. The Schmidt couplings 98 and 99 are shaft couplings that transmit the rotation of an input shaft to an output shaft. The Schmidt couplings 98 and 99 are capable of conveying the rotation of the input shaft to the output shaft even when the output shaft moves in same plane relative to the input shaft, which is fixed in the same plane, and the distance between the shaft cores of the two shafts changes.

The revolving shafts 94, 95, 96 and 97 are supported by horizontally mobile plates 62a, 61a, 62b and 61b, respectively. The horizontally mobile plates 62a, 61a, 62b and 61b move horizontally due to a horizontal driving mechanism 55 that is shown in FIG. 5 and the like. The horizontally mobile plates 61a and 62a have mutually identical movements, and the horizontally mobile plates 61b and 62b have mutually identical movements. The horizontal driving mechanism 55 will be explained here using the horizontally mobile plates 61a and 61b as an example. As shown in FIG. 5, the horizontal driving mechanism 55 has a driving mechanism 75 for separating or bringing together the horizontally mobile plates 61a and 61b, and guide parts and guide rails for slidably supporting the movement of the horizontally mobile plates 61a and 61b in the horizontal direction.

The driving mechanism 75 includes a ball screw 80a, first and second nut members 81 and 82, first and second linking rods 83 and 84, a pair of third linking rods 85 and a fourth linking rod 86. The ball screw 80a rotates due to rotation of a servo motor 80 (see FIG. 3). The first and second nut members 81 and 82 screw onto the ball screw 80a. The first and second linking rods 83 and 84 are provided so as to be perpendicular to the ball screw 80a in the horizontal direction. The third linking rods 85 are provided along the direction of movement. The fourth linking rod 86 is provided parallel to the third linking rods 85.

The first linking rod 83 is linked to the pair of third linking rods 85 via a joint 87. The ends of the pair of third linking rods 85 are fixed to the lateral face of the horizontally mobile plate 61b. The pair of third linking rods 85 are slidably inserted through the horizontally mobile plate 61a. The second linking rod 84 is linked to the fourth linking rod 86 via a joint 88. The end of the fourth linking rod 86 is fixed to the lateral face of the horizontally mobile plate 61a.

The portion of the ball screw 80a threadably engaged with the first nut member 81, and the portion threadably engaged with the second nut member 82 are oppositely threaded with respect to one another.

The ball screw 80a rotates due to this driving mechanism 75, whereby the horizontally mobile plates 61a and 61b can be brought together or separated.

Operation of Bag Manufacturing and Packaging Part 5 Upstream of Horizontal Sealing Process The operation of the bag manufacturing and packaging system 1 upstream of the horizontal sealing mechanism 17 will be described next.

The operation of the bag manufacturing and packaging system 1 will initially be described on the basis of FIG. 2 up until the horizontal sealing process performed by the horizontal sealing mechanism 17.

The sheet-form film F that is fed to the shape-forming mechanism 13 from the film-feeding part 6 is rolled onto the tube 31 from the former 32 and shaped into a tube shape. The film is directly conveyed downward by the pull-down belt mechanism 14. The peripheral surfaces of both end parts of the film F are then made to overlap while the film is wrapped around the tube 31, and the overlapping portions are vertically sealed by the vertical sealing mechanism 15.

The tubular film F, which has been vertically sealed and made into a cylindrical shape, detaches from the tube 31 and falls into the horizontal sealing mechanism 17. Clusters of the articles pass through the tube 31 from the combination weighing machine 2 at this time and drop simultaneously with the motion of the tubular film F. The upper ends of the bag B and the portions of the lower ends of the following bag B on the upper parts of the bag B in which the articles are present are then horizontally heat-sealed in the horizontal sealing mechanism 17 in a state in which the articles are present within the tubular film F.

Figure 6:
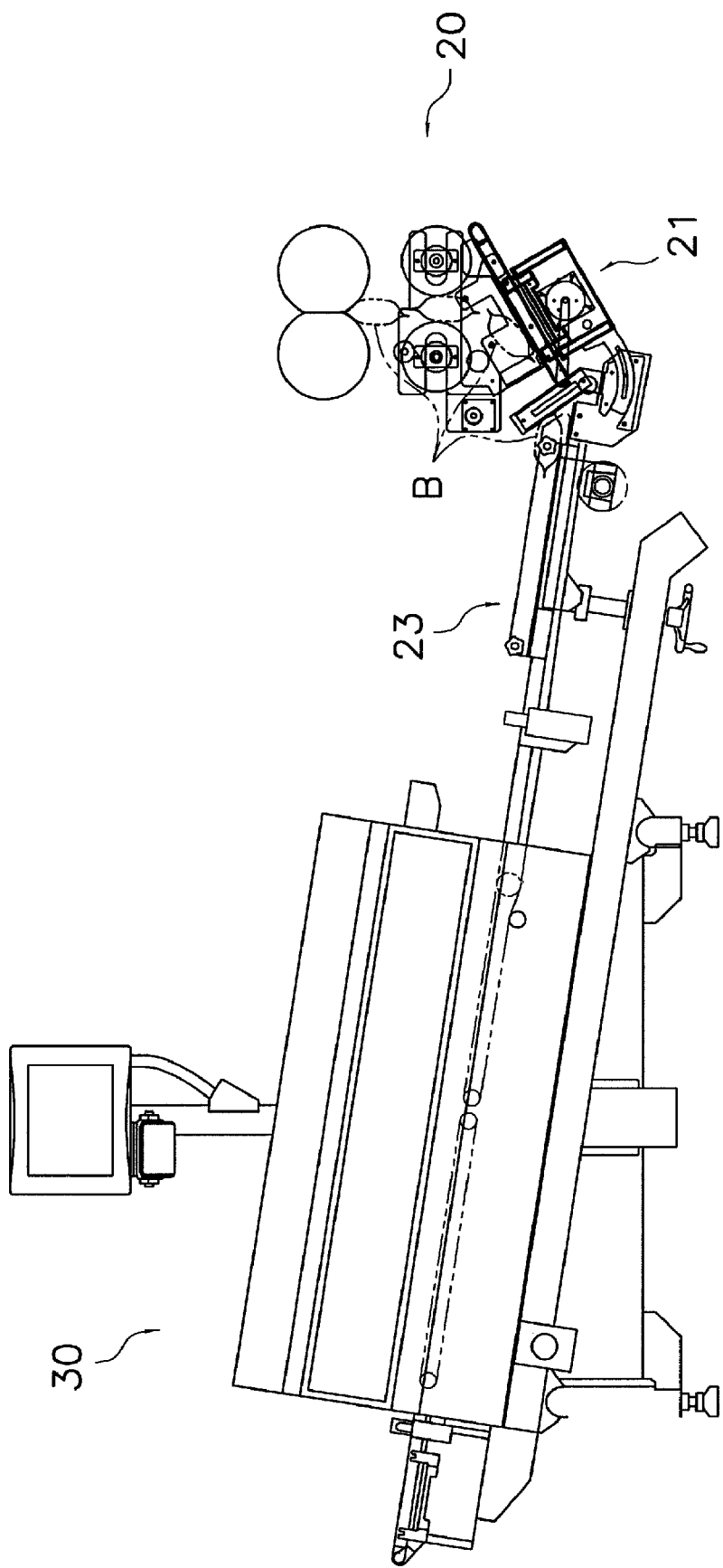
FIG. 6 is an enlarged front elevational view of a part of the bag manufacturing and packaging system shown in FIG. 2 that is further downstream from a bag manufacturing and packaging machine according to the illustrated embodiment of the present invention.

Operation of Bag Manufacturing and Packaging System 1 Downstream of Horizontal Sealing Process The bags B, which are continuously manufactured as described above, drop from the horizontal sealing mechanism 17 through the rotating brush mechanism 20 to the chute conveyor 21 (see the drop position shown in FIG. 7), as shown in FIGS. 2 and 6. The bags B are then conveyed downstream in the direction of conveyance by the chute conveyor 21, passed along the conveyor 23, and fed to the seal checker 30 or other devices in subsequent steps (post-processing devices).

Configuration of Rotating Brush Mechanism 20

The bag manufacturing and packaging system 1 of the present embodiment includes the rotating brush mechanism 20 between the chute conveyor 21 and the horizontal sealing mechanism 17 of the vertical bag manufacturing and packaging part 5, as shown in FIG. 7.

As shown in FIG. 7, the rotating brush mechanism 20 includes a pair of rotating brushes 201a and 201b, a driving motor 202 and a guide member having a pair of guide parts 25. The rotating brushes 201a and 201b rotate around respective rotational axes in the direction of the arrows shown in FIG. 8. The driving motor 202 drives (rotates) the rotating brushes 201a and 201b. The rotating brush mechanism 20 is fixed to the chute conveyor 21 by an attachment plate 203.

The attachment plate 203 is anchored by an anchoring screw 203b that is screwed into a groove 203a portion. The anchoring screw 203b is loosened and made to move along the groove 203a, whereby the distance between the rotating brush mechanism 20 and the conveying surface chute conveyor 21 can be adjusted.

When the length of the bags B in the direction of conveyance is X, the rotating brush mechanism 20 is positioned below the horizontal sealing mechanism 17 at a distance X and is positioned above the drop position on the chute conveyor 21 at the distance X as shown in FIG. 7. In other words, the rotating brush mechanism 20 is positioned at an intermediate position between the horizontal sealing mechanism 17 and the chute conveyor 21. Therefore, when the bags B are ejected from the horizontal sealing mechanism 17, the bags B come into contact with the rotating brush mechanism 20 at substantially the same time that the bags B leave the horizontal sealing mechanism 17. In the same manner, the bags B come into contact with the chute conveyor 21 at substantially the same time that the bags B are ejected from the rotating brush mechanism 20. The transfer of the bags B can therefore be smoothly accomplished without the bags B being subjected to impact.

The rotating brushes 201a and 201b are positioned as shown in FIG. 7 so that the rotational axes of the rotating brushes 201a and 201b are parallel to each other and horizontally oriented. The bags B are fed from the horizontal sealing mechanism 17 in a state in which the bags B are suspended from the sealed portion on the upper end. The pair of rotating brushes 201a and 201b guide the bags B between the rotating brushes 201a and 201b, which rotate in the directions of the arrows in FIG. 7, so that the bags B are sandwiched by the rotating brushes 201a and 201b from both sides. The rotating brushes 201a and 201b cause the bags B to drop at a predetermined position on the chute conveyor 21 (see the drop position X shown in FIG. 7). The rotating brushes 201a and 201b have the same size, and the end portions of the bristles of the brushes, which as a whole have substantially equal lengths, make circular paths around the rotational axes.

Accordingly, as long as the bags B are disposed within a range extending from the vicinity of the top parts of the rotating brushes 201a and 201b to an interior portion between the rotating brushes 201a and 201b, the bags B can be caught by at least one of the rotating brushes 201a and 201b and eventually guided between the rotating brushes 201a and 201b. In other words, as shown in FIG. 13, even when a bag adheres to one of the sealing jaws 51 and 52 of the horizontal sealing mechanism 17 and does not drop into the central portion between the rotating brushes 201a and 201b, the bag can be guided to the drop position of the chute conveyor by the rotating brushes 201a and 201b in a reliable manner. The bag does not drop into the central portion between the rotating brushes 201a and 201b means that the bag drops towards the rotating brush 201a or towards the rotating brush 201b, or that the bag is displaced in the direction parallel to the rotational axes of the rotating brushes 201a and 201b.

The rotating brushes 201a and 201b rotate at a speed equal to or slightly greater than the speed of manufacture of the bags B in the vertical bag manufacturing and packaging part 5 so that the bags B do not accumulate in the rotating brush mechanism 20. The rotating brushes 201a and 201b are positioned so that the gap or distance between the rotating brushes 201a and 201b is slightly narrower than the thickness of the bags B. The rotating brushes 201a and 201b have an adjusting mechanism 204 for adjusting the distance between the rotating brushes 201a and 201b in accordance with the thickness of the bags B.

The rotating brushes 201a and 201b have flexible brush portions in which the bristles extend in the radial direction about the rotational axes. In the drawings, the brushes are represented as simple circles for the sake of brevity. The bags B that are conveyed so as to be sandwiched between the rotating brushes 201a and 201b are therefore conveyed to the chute conveyor 21 while receiving an appropriate pressure from both sides due to the elasticity of these brush portions.

Figure 8:
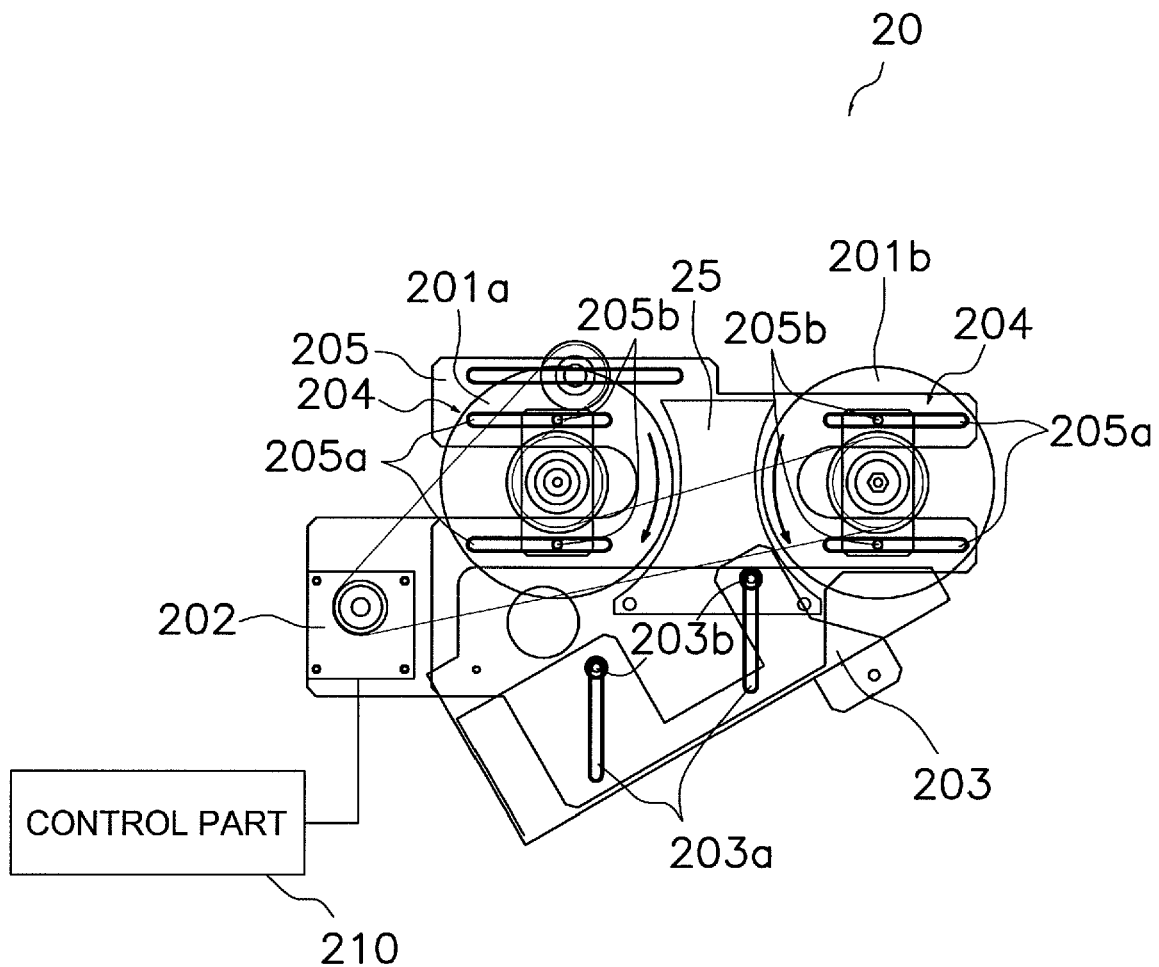
FIG. 8 is an enlarged front elevational view of the rotating brush mechanism shown in FIG. 7 according to the illustrated embodiment of the present invention.

The driving motor 202 drives the rotation of the rotating brushes 201a and 201b via a belt as shown in FIG. 8. The driving motor 202 is connected to a control part 210. The speed of the driving motor is controlled by the control part 210 in accordance with the speed of operation of the vertical bag manufacturing and packaging part 5.

The adjusting mechanism 204 includes anchoring screws 205b and grooves 205a that are formed on a plate 205 for supporting the rotating brushes 201a and 201b from the lateral surface. The rotating brushes 201a and 201b are made to move along the grooves 205a and are fixed in a predetermined position using the anchoring screws 205b, whereby the distance between the rotating brushes 201a and 201b can be changed.

Figure 9:
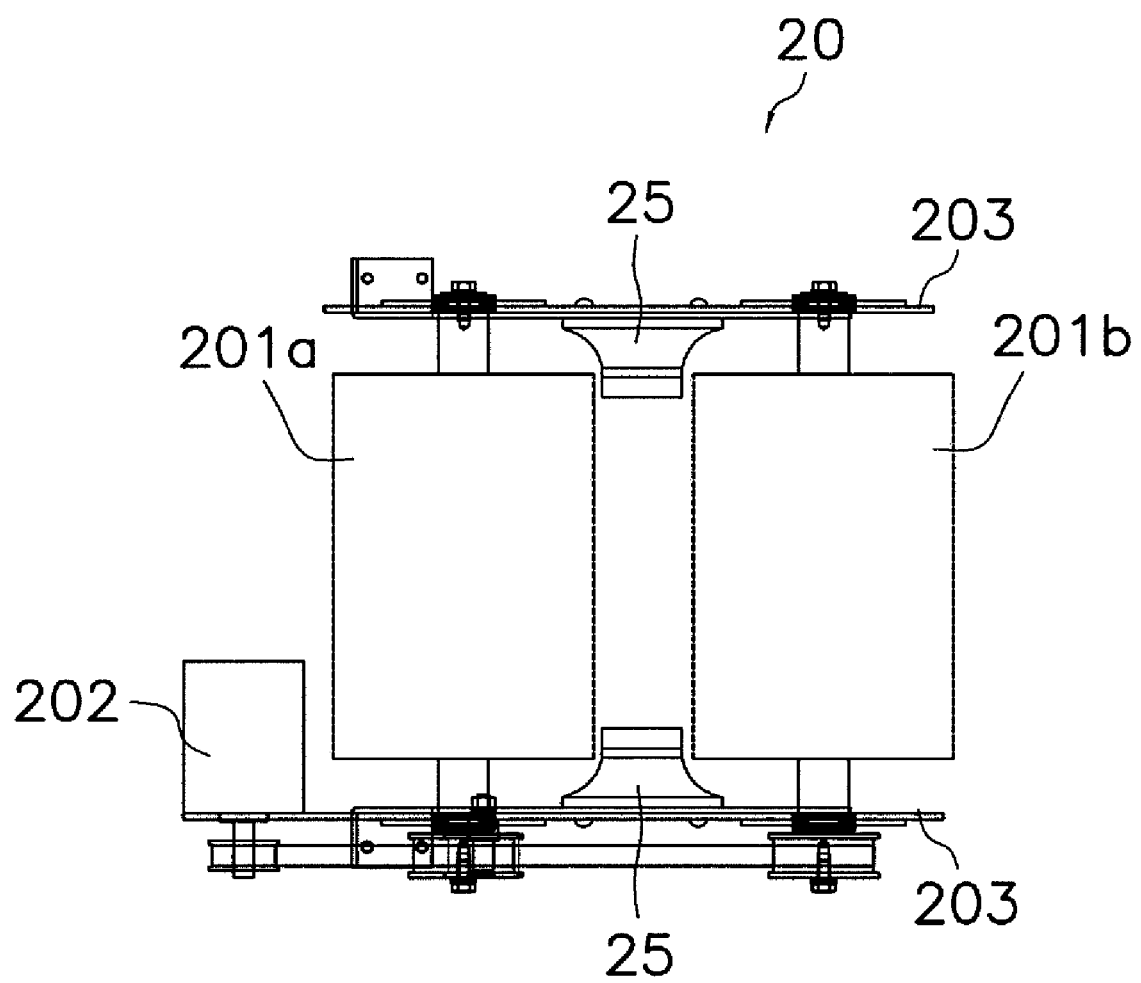
FIG. 9 is an enlarged top plan view of the rotating brush mechanism shown in FIG. 7 according to the illustrated embodiment of the present invention.

The guide parts 25 are arranged as plate members that restrict the direction of movement of the bags B so that, as shown in FIGS. 7 through 9, the bags B that drop from the horizontal sealing mechanism 17 do not deviate with respect to the direction parallel to the rotational axes of the rotating brushes 201a and 201b of the rotating brush mechanism 20. The interval between the guide parts 25 can be adjusted in accordance with the size of the bags B and the length (width) of the bags B in the widthwise direction of the rotating brushes 201a and 201b. The details of the configuration of the guide parts 25 will be described hereinafter.

Configuration of Guide Parts 25

As described above, the guide parts 25 are a pair of plate members for centering the bags B so that the bags B that drop onto the rotating brush mechanism 20 are guided to a predetermined drop position on the chute conveyor 21 that is positioned downstream. The guide parts 25 are positioned between the rotating brushes 201a and 201b, as shown in FIGS. 7 through 9. Specifically, the two guide parts 25 are both positioned between the rotating brushes 201a and 201b and slightly further inward than the end parts of the rotating brushes 201a and 201b in the direction parallel to the rotational axes, as shown in FIG. 9. "Centering the bags B" refers to guiding the bags B toward the central portion of the rotating brushes 201a and 201b with respect to the direction parallel to the rotational axes of the rotating brushes 201a and 201b.

Figure 10:
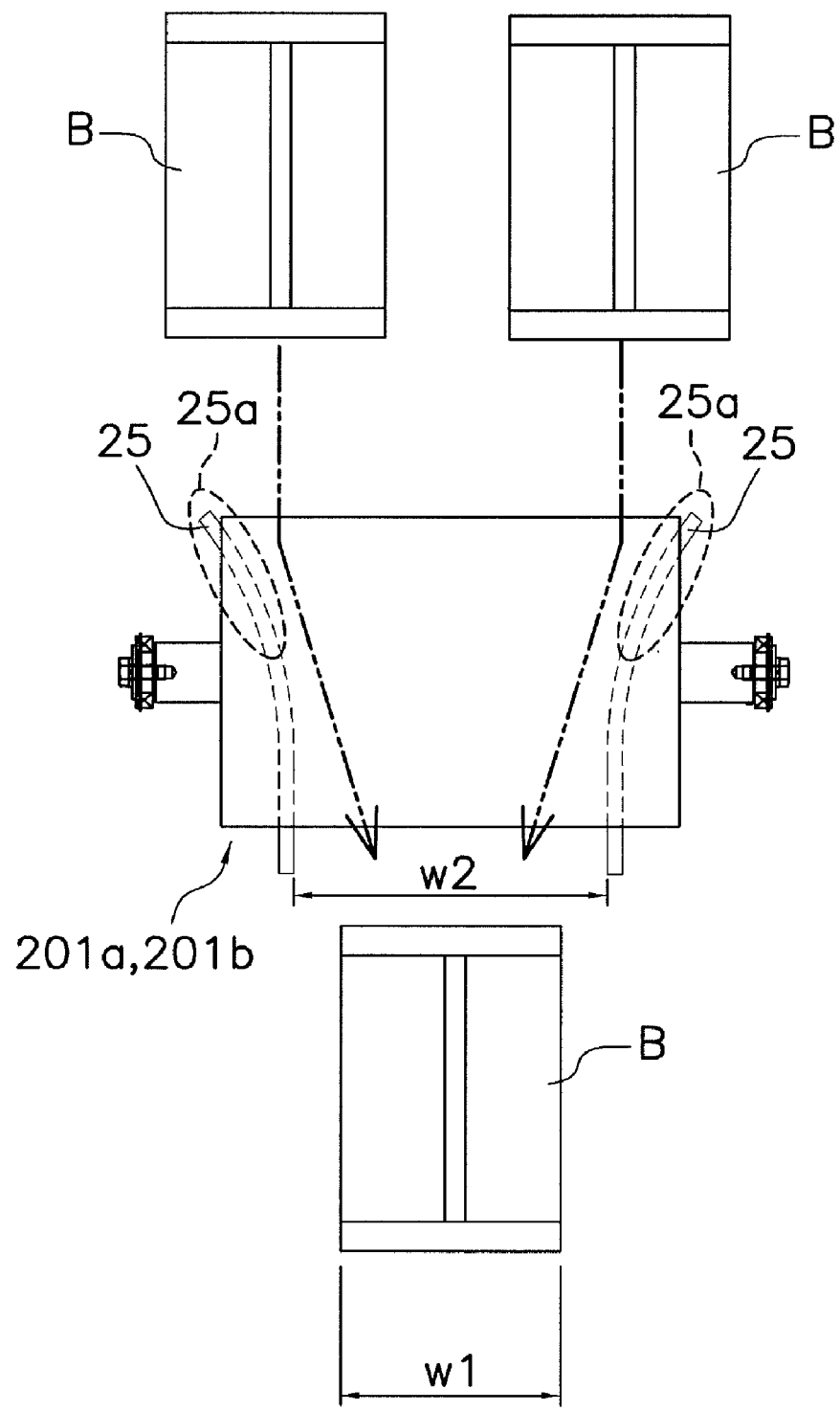
FIG. 10 is an enlarged front elevational view of a pair of rotating brushes mechanism and a guide member of the rotating brush mechanism shown in of FIG. 9 illustrating the positional relationships between those parts according to the illustrated embodiment of the present invention.
Figure 11A:
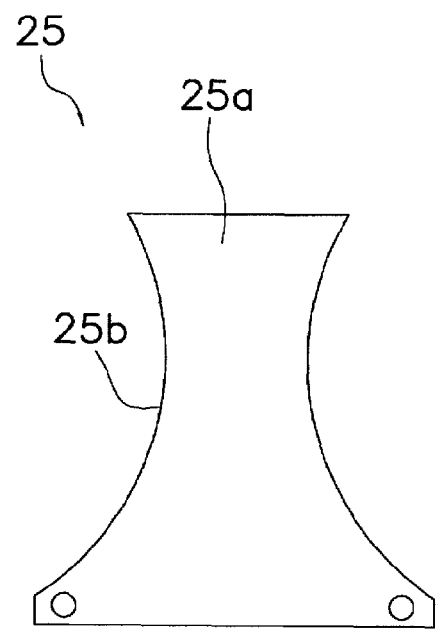
FIG. 11A is an enlarged front elevational view a guide part of the guide member shown in FIG. 10 according to the illustrated embodiment of the present invention.
Figure 11B:
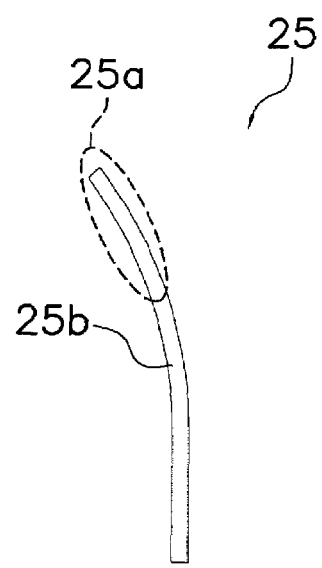
FIG. 11B is a side elevational view of the guide part shown in FIG. 11A according to the illustrated embodiment of the present invention.

Each of the guide parts 25 has a guiding portion 25a on the upper end portion thereof as shown in FIGS. 10, 11A and 11B. As shown in FIG. 10, the guiding portions 25a of the guide parts 25 are positioned symmetrically. The guiding portions 25a bend toward the outside from the center with respect to the direction parallel to the rotational axes of the rotating brushes 201a and 201b when viewed in a direction perpendicular to the rotational axes of the rotating brushes 201a and 201b as shown in FIG. 10. The bags B that are conveyed from the horizontal sealing mechanism 17 therefore drop between the guiding portions 25a that are formed on the upper end portions of the guide parts 25. The upper end portions of the guide parts 25 form a large aperture relative to the lower end portions of the guide parts 25. In other words, a distance between the guiding portions 25a of the guide parts in the direction parallel to the rotational axes of the rotating brushes is larger at an upstream end portion of the guide parts than at a downstream end portion of the guide parts. The bags B are thus guided toward the vicinity of the center of the rotating brushes 201a and 201b. As shown in FIG. 10, the position of the bags B that are conveyed from the upstream horizontal sealing mechanism 17 can thereby be guided to the central portion by the guide parts 25 even in the case of displacement in the direction parallel to the rotational axes of the rotating brushes 201a and 201b, whereby the bags B can be stably conveyed to a predetermined position on the downstream chute conveyor 21.

The guide parts 25 are positioned so that the interval or distance between the guide parts at the lower end portion, where the gap or distance in the direction parallel to the rotational axes of the rotating brushes 201a and 201b is narrowest, is an interval w2 that is slightly larger than the width w1 of the bags B. The bags B can thereby be smoothly conveyed downstream in the correct orientation.

The guide parts 25 are fixed to the attachment plate 203 as shown in FIG. 8. The guide parts 25 have arc-shaped portions 25b (arcuate portion) that are formed along the outside circumference of the rotating brushes 201a and 201b, as shown in FIGS. 11A and 11B. Contact of the guide parts 25 with the brush portions of the rotating brushes 201a and 201b can thereby be avoided and the bags B can be centered even when the guide parts 25 are positioned adjacent to the rotating brushes 201a and 201b.

Configuration of Chute Conveyor 21

Figure 12:
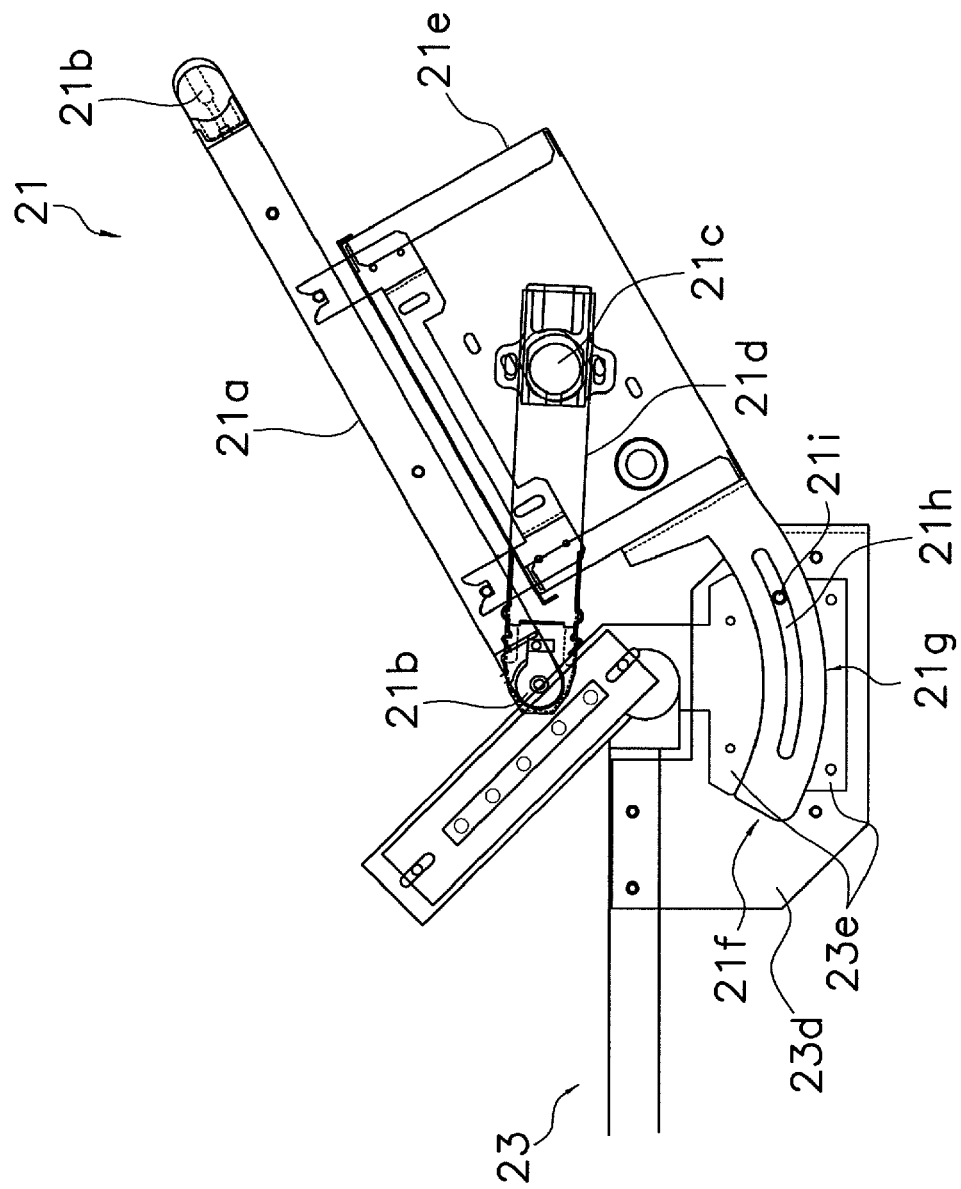
FIG. 12 is an enlarged front elevational view of the chute conveyor of the bag manufacturing and packaging system shown in FIG. 2 according to the illustrated embodiment of the present invention.

The chute conveyor 21 is positioned directly below the rotating brush mechanism 20, as shown in FIG. 2. The chute conveyor receives and conveys downstream the dropping bags in a state of being positioned so that the angle of the conveyance surface is approximately 30°. As shown in FIG. 12, the chute conveyor 21 includes an endless horizontal belt 21a, a pair of driving rollers 21b, a motor 21c and a timing belt 21d. The endless horizontal belt 21a conveys objects thereon. The driving rollers 21b support the horizontal belt 21a from the inside. The motor 21c generates rotational driving force. In the chute conveyor 21, the rotational driving force of the motor 21c is transmitted to the driving roller 21b by the timing belt 21d, and the horizontal belt 21a rotates, whereby the objects mounted on the horizontal belt 21a are conveyed in the desired direction.

The chute conveyor 21 also has a motor box 21e within which the motor 21c and the like are housed, and a rotating frame 21f that is attached downstream from the motor box 21e.

The rotating frame 21f has an arcuate portion 21g that is rotatably supported between two plates 23e that are affixed to a frame 23d of the conveyor 23. The arcuate portion 21g is a plate member that is formed so as to include two arcs that have different radii centered on the axis of rotation of the downstream driving roller 21b. A groove 21h that is parallel to the two arcs is formed on the arcuate portion 21g. An anchoring screw 21i, which is screwed into a female screw hole formed on the side of the frame 23d of the conveyor 23, is inserted into the groove 21h. By tightening the anchoring screw 21i at the desired position, the rotating frame 21f is fixed to the frame 23d of the conveyor 23 that is positioned downstream. By thus moving the arcuate portion 21g between the two plates 23e and fixing the arcuate portion using the anchoring screw 21i, the entirety of the chute conveyor 21 is made to rotate using the axis of rotation of the downstream driving roller 21b as a virtual axis of rotation, and the angle of the chute conveyor 21 and the height of the upstream end part thereof can be adjusted. The adjustment of the receiving angle of the chute conveyor 21 and the adjustment of the distance between the rotating brush mechanism 20 and the drop position of the bags on the chute conveyor 21 can therefore be easily adjusted in accordance with the size, shape, or other characteristic of the bags that drop from the rotating brush mechanism 20. Forward rolling of the bags that drop from the rotating brush mechanism 20 can thereby be prevented, and the bags can be conveyed smoothly downstream in a set orientation.

Features of Bag Manufacturing and Packaging System 1

(1) The bag manufacturing and packaging system 1 of the present embodiment includes the rotating brush mechanism 20 configured to receive the bags B that are conveyed from the horizontal sealing mechanism 17 of the vertical bag manufacturing and packaging part 5 and to convey the bags onto the chute conveyor 21 that is positioned downstream, as shown in FIGS. 7 through 10. The rotating brush mechanism 20 includes the rotating brushes 201a and 201b and the guide parts 25, which are positioned between the rotating brushes. The guide parts 25 guide the bags B that are conveyed therebetween so that the bags are centered toward the vicinity of the center of the rotating brushes 201a and 201b in direction of the rotational axes.

The bags B conveyed from upstream can thereby be smoothly guided to a predetermined drop position on the downstream chute conveyor 21 as shown in FIG. 10 even when the receiving position of the bags B is displaced in the direction parallel to the rotational axes of the rotating brushes 201a and 201b. As a result, states of conveyance on the chute conveyor 21 is stabilized, and the production efficiency of the entire bag manufacturing and packaging system 1 can be improved.

(2) The bag manufacturing and packaging system 1 of the present embodiment includes a combination of two guides that constitute the guide parts 25, as shown in FIGS. 9 and 10.

The bags B are thereby sandwiched between the two guide parts 25 and conveyed downstream, whereby the bags B can be centered while passing between the rotating brushes 201a and 201b, and the bags B can be conveyed to the chute conveyor 21, which is positioned downstream, at a stable position even when the receiving position of the bags B is displaced in the direction parallel to the rotational axes of the rotating brushes 201a and 201b.

(3) In the bag manufacturing and packaging system 1 of the present embodiment, the guide parts 25 that are positioned between the rotating brushes 201a and 201b included in the rotating brush mechanism 20 have the guiding portions 25a on the upper end parts, as shown in FIGS. 10 and 11B. The interval between the guiding portions 25a widens in the upward direction.

The bags B that drop from the horizontal sealing mechanism 17 positioned above the rotating brush mechanism 20 can thereby be guided inward along the inner-wall surfaces of the guiding portions 25a. As a result, the bags B that drop near the end parts in the direction parallel to the rotational axes of the rotating brushes 201a and 201b can be smoothly centered and guided to a predetermined drop position on the chute conveyor 21.

(4) In the bag manufacturing and packaging system 1 of the present embodiment, the guide parts 25 that are included in the rotating brush mechanism 20 are positioned so as to open at an interval (width w2) that is slightly larger than the width-wise length (width w1) of the bags B that are conveyed into the rotating brush mechanism 20, as shown in FIG. 10.

The orientation of the bags B that fall from the horizontal sealing mechanism 17 can thereby be straightened, and the bags B can be smoothly conveyed to the downstream chute conveyor 21. The interval between the guide parts 25 is set using the width w1 of the conveyed bags B as a standard, whereby the precision of the drop position of the bags B on the downstream chute conveyor 21 can be improved.

(5) In the bag manufacturing and packaging system 1 of the present embodiment, the pair of guide parts 25 that are included in the rotating brush mechanism 20 are both positioned further inward in the direction parallel to the rotational axes than the both end parts of the rotating brushes 201a and 201b, as shown in FIGS. 9 and 10.

The bags B that drop onto the rotating brushes 201a and 201b can thereby be guided toward the vicinity of the center of the rotating brushes 201a and 201b, and the bags B can be accurately transferred to a predetermined drop position on the downstream chute conveyor 21.

(6) In the bag manufacturing and packaging system 1 of the present embodiment, the guide parts 25 that are included in the rotating brush mechanism 20 have the arcuate portions 25b on the portions that are positioned adjacent to the rotating brushes 201a and 201b, as shown in FIGS. 8 through 11(A).

The arcuate portions are formed along the outside diameters of the rotating brushes 201a and 201b.

The guide parts 25 can thereby be positioned adjacent to the rotating brushes 201a and 201b without any gap. As a result, the bags B can be prevented from dropping out from between the rotating brushes 201a and 201b and the guide parts 25, and the bags can be smoothly conveyed to a predetermined position on the downstream chute conveyor 21.

(7) In the bag manufacturing and packaging system 1 of the present embodiment, the rotating brushes 201a and 201b that are included in the rotating brush mechanism 20 have bristles that have flexible surfaces.

Movement of the bags B in the horizontal direction due to the guide parts 25 will thereby not be inhibited, and the bags B can be smoothly centered, even when sandwiched between the flexible rotating brushes 201a and 201b.

Accordingly, the bag manufacturing and packaging system of the illustrated embodiment of the present invention provides an effect in which the bags are centered in the rotating brushes 201a and 201b even in instances in which the position of the bags conveyed between the rotating brushes 201a and 201b from upstream is displaced, or in which the bags are conveyed slantwise. The bags can thereby be stably dropped onto a predetermined position on the conveyor part (chute conveyor 21) positioned downstream. The bag manufacturing and packaging system of the present invention can therefore be widely applied to conveyance apparatuses for sandwiching products between rotating brushes and for conveying the products downstream.

Modified Embodiments

One embodiment of the present invention was described above, but the present invention is not limited to the aforementioned embodiment, and various changes are possible as long as no deviation is made from the scope of the invention.

(A) In the aforementioned embodiment, an example was described in which two guides were provided as the guide parts 25 (guide member) as shown in FIGS. 9 and 10 and the like. However, the present invention is not limited to this configuration.

The number of guide parts included in the guide member may also be, e.g., one or three or more. An effect in which the bags conveyed to the rotating brush mechanism can be centered and stably conveyed to a predetermined position on the chute conveyor can also be obtained in these instances in the same manner as above.

(B) In the aforementioned embodiment, an example was described in which rotating brushes having bristles of a substantially uniform length in the direction parallel to the rotational axes were used as the rotating brushes 201a and 201b included in the rotating brush mechanism 20, as shown in FIG. 9 and the like. However, the present invention is not limited to this configuration.

Figure 14:
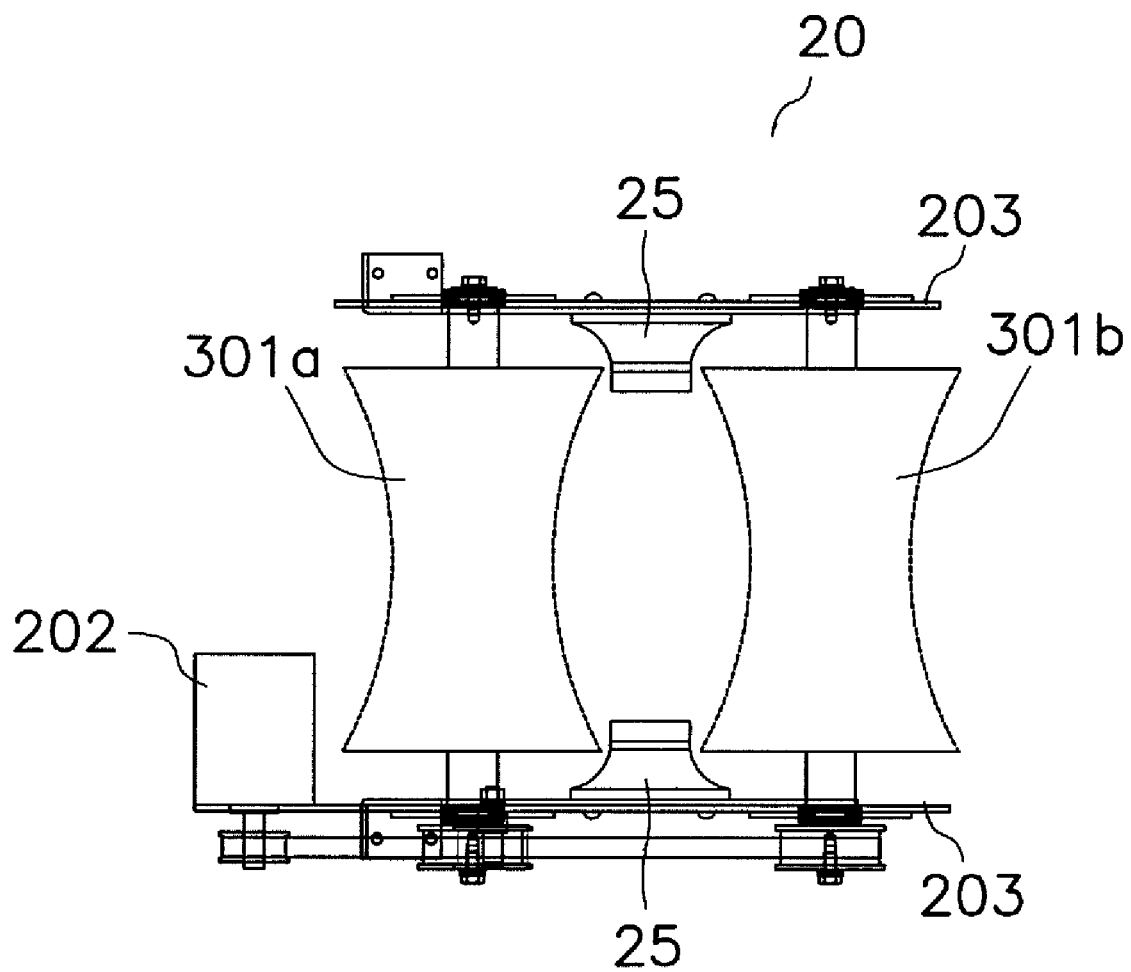
FIG. 14 is a top plan view of the rotating brush mechanism according to a first modified embodiment of the present invention.

More specifically, a pair of rotating brushes 301a and 301b in which the bristles in the central portion in the direction parallel to the rotational axes are shorter and the bristles facing the ends are longer may also be used, as shown in FIG. 14.

As a result, for example, the bags that drop near the ends of the rotating brushes in the direction parallel to the rotational axes can be guided toward a center that has a low contact resistance. As a result, the bags can be more effectively centered with the combination of the guide parts 25, and the bags can be stably conveyed to a predetermined position on the chute conveyor 21.

(C) In the aforementioned embodiment, an example was described in which the guide parts 25 were positioned slightly further inward than the axial end parts of the rotating brushes 201a and 201b, as shown in FIGS. 9 and 10. However, the present invention is not limited to this configuration.

The guide parts may also be, e.g., positioned from further outside to further inside relative to the axial end parts of the rotating brushes. The bags B whose receiving position is displaced to the outside of the rotating brushes can also be centered in this instance.

(D) In the aforementioned embodiment, an example was described in which the arc-shaped portions 25b were provided to portions of the guide parts 25 positioned adjacent to the rotating brushes 201a and 201b, as shown in FIG. 11A. However, the present invention is not limited to this configuration.

Adjoining parts that are structured from, e.g., a plurality of straight lines that are bound together may be formed instead of arc-shaped parts.

(E) In the aforementioned embodiment, an example was described in which the guiding portions 25a that are substantially arc-shaped when viewed from the side were formed on the upper-end portions of the guide parts 25. However, the present invention is not limited to this configuration.

The shape used for the guiding parts may also be, e.g., a straight line when viewed from the side.

(F) In the aforementioned embodiment, an example was described in which the sealing jaws 51 and 52 of the horizontal sealing mechanism 17 moved in a substantially D-shaped fashion. However, the present invention is not limited to this configuration.

The horizontal sealing mechanism may also be provided with, e.g., rotary-type sealing jaws that are substantially not D-type, or the horizontal sealing mechanism may employ, e.g., a box motion sealing system and other systems.

(G) In the aforementioned embodiment, an example was described in which the two rotating brushes 201a and 201b were positioned horizontally. However, the present invention is not limited to this configuration.

The two rotating brushes may also be positioned, e.g., slantwise as shown in FIG. 15. The bags can be sent in the direction of conveyance of the bags in this instance, and therefore the bags can be dropped onto the chute conveyor 21 at an obtuse angle.

(H) In the aforementioned embodiment, an example was described in which the rotating brushes 201a and 201b were driven by the single driving motor 202. However, the present invention is not limited to this configuration.

Figure 16:
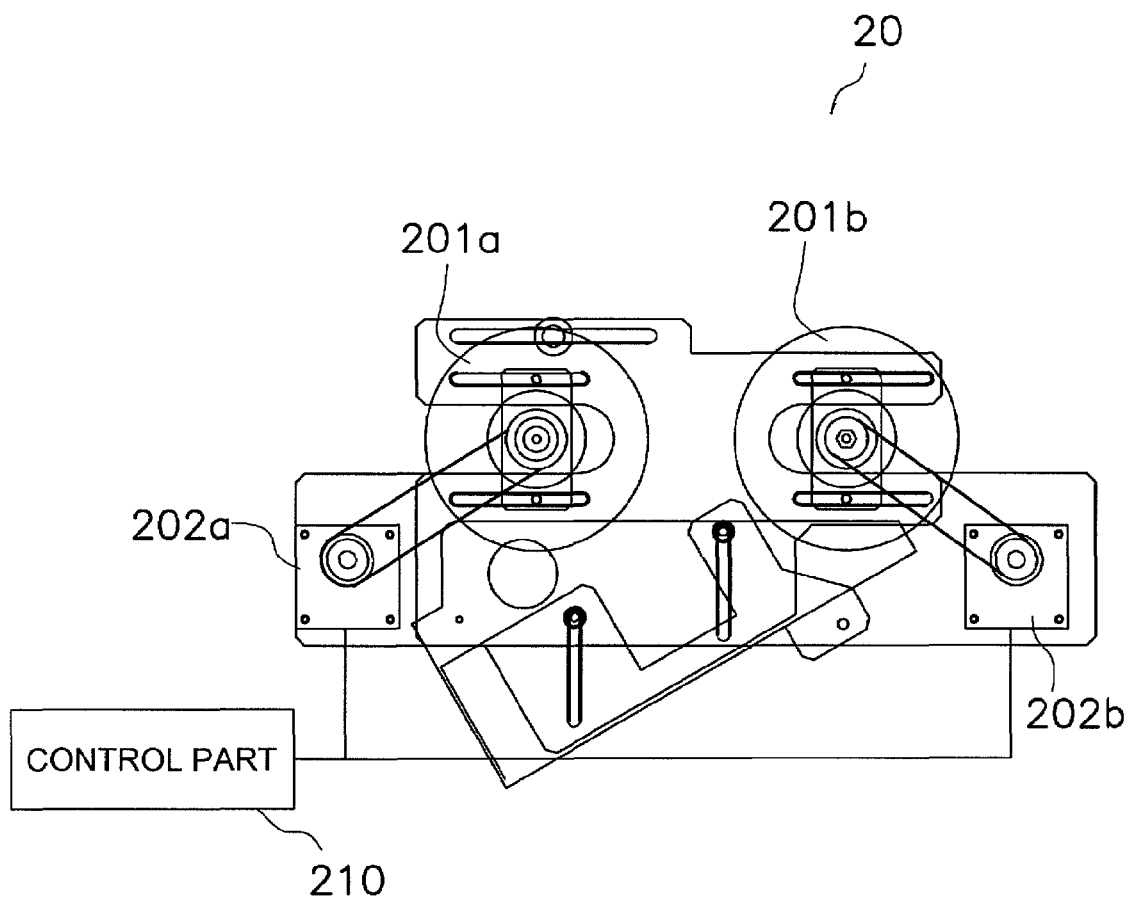
FIG. 16 is a front elevational view of the rotating brush mechanism according to a third modified embodiment of the present invention.

A configuration may also be used in which, e.g., the rotating brushes 201a and 201b are driven independently by two driving motors 202a, 202b, as shown in FIG. 16. A difference in rotational speeds can be provided to the rotating brushes 201a and 201b in this instance, whereby the orientation and ejection position of the bags B that are ejected to the chute conveyor 21 can be changed.

(I) In the aforementioned embodiment, an example was described in which the rotating brush mechanism 20 was fixed to the chute conveyor 21. However, the present invention is not limited to this configuration.

The rotating brush mechanism 20 may also be fixed to, e.g., the vertical bag manufacturing and packaging part 5 or the conveyor 23. The angle of the rotating brush mechanism 20 can be held constant in this instance even when the chute conveyor 21 is rotated and the angle of the conveyance surface is changed, and therefore the rotating brush mechanism 20 is preferably fixed to a structure other than the chute conveyor 21.

(J) In the aforementioned embodiment, an example was described in which the chute conveyor 21 was positioned downstream from the rotating brush mechanism 20. However, the present invention is not limited to this configuration.

A configuration in which, e.g., an immobile metal chute (a J-chute (slide) or the like) is used may also be employed. This case is inexpensive in comparison to using the chute conveyor 21.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bag manufacturing and packaging system comprising:
   a vertical bag manufacturing and packaging machine configured and arranged to manufacture a bag by sealing a continuous tubular packaging material filled with articles to be packaged, and to cut out and eject the bag;
   a conveyor part disposed in a downstream portion of the vertical bag manufacturing and packaging machine to receive the bag ejected from the vertical bag manufacturing and packaging machine at a predetermined position to convey the bag toward a downstream portion of the conveyor part;
   a pair of rotating brushes positioned between the vertical bag manufacturing and packaging machine and the conveyor part to sandwich the bag ejected from the vertical bag manufacturing and packaging machine to send the bag to the predetermined position on the conveyor part; and
   a guide member disposed between the rotating brushes with at least a portion of the guide member overlapping with the rotating brushes when viewed in a generally horizontal direction that is perpendicular to rotational axes of the rotating brushes, the guide member being arranged to guide the bag conveyed between the rotating brushes toward a center portion of the rotating brushes with respect to a direction parallel to the rotational axes of the rotating brushes.

2. The bag manufacturing and packaging system according to claim 1, wherein
the guide member includes a plurality of guide parts that are spaced apart in the direction parallel to the rotational axes of the rotating brushes.

3. The bag manufacturing and packaging system according to claim 2, wherein
each of the guide parts of the guide member includes a guiding portion dimensioned such that a distance between the guiding portions of the guide parts in the direction parallel to the rotational axes of the rotating brushes is larger at an upstream end portion of the guide member than at a downstream end portion of the guide member.

4. The bag manufacturing and packaging system according to claim 3, wherein
the guide parts of the guide member are spaced apart in the direction parallel to the rotational axes of the rotating brushes by a distance that is larger than a width of the bag conveyed between the rotating brushes.

5. The bag manufacturing and packaging system according to claim 3, wherein
the guide parts of the guide member are disposed in positions located inwardly from axial end parts of the rotating brushes in the direction parallel to the rotational axes of the rotating brushes.

6. The bag manufacturing and packaging system according to claim 3, wherein
each of the guide parts of the guide member includes an arcuate portion disposed adjacent to the rotating brushes.

7. The bag manufacturing and packaging system according to claim 3, wherein
each of the rotating brushes includes a flexible brush portion.

8. The bag manufacturing and packaging system according to claim 2, wherein
the guide parts of the guide member are spaced apart in the direction parallel to the rotational axes of the rotating brushes by a distance that is larger than a width of the bag conveyed between the rotating brushes.

9. The bag manufacturing and packaging system according to claim 8, wherein
the guide parts of the guide member are disposed in positions located inwardly from axial end parts of the rotating brushes in the direction parallel to the rotational axes of the rotating brushes.

10. The bag manufacturing and packaging system according to claim 8, wherein
each of the guide parts of the guide member includes an arcuate portion disposed adjacent to the rotating brushes.

11. The bag manufacturing and packaging system according to claim 8, wherein
each of the rotating brushes includes a flexible brush portion.

12. The bag manufacturing and packaging system according to claim 2, wherein
the guide parts of the guide member are disposed in positions located inwardly from axial end parts of the rotating brushes in the direction parallel to the rotational axes of the rotating brushes.

13. The bag manufacturing and packaging system according to claim 12, wherein
each of the guide parts of the guide member includes an arcuate portion disposed adjacent to the rotating brushes.

14. The bag manufacturing and packaging system according to claim 12, wherein
each of the rotating brushes includes a flexible brush portion.

15. The bag manufacturing and packaging system according to claim 2, wherein
each of the guide parts of the guide member includes an arcuate portion disposed adjacent to the rotating brushes.

16. The bag manufacturing and packaging system according to claim 15, wherein
each of the rotating brushes includes a flexible brush portion.

17. The bag manufacturing and packaging system according to claim 2, wherein
each of the rotating brushes includes a flexible brush portion.

18. The bag manufacturing and packaging system according to claim 1, wherein
each of the rotating brushes includes a flexible brush portion.

* * * * *